United States Patent
Hugin

[15] 3,655,053
[45] Apr. 11, 1972

[54] SEWAGE LIFT STATION

[72] Inventor: Adolph C. Hugin, 7602 Boulder Street, North Springfield, Va. 22151

[22] Filed: Feb. 16, 1971

[21] Appl. No.: 115,380

[52] U.S. Cl. ............................................. 210/152, 210/180
[51] Int. Cl. ......................................................... B01d 57/00
[58] Field of Search ..................... 210/180, 218, 152, 187, 63

[56] References Cited

UNITED STATES PATENTS 3,337,455   8/1967   Wilson et al. ............................... 210/63

*Primary Examiner*—J. L. DeCesare

[57] ABSTRACT

Sewage lift stations comprising a tank or well into which sewage flows through an inlet a suitable height above the bottom of the tank to provide for collection of a desired quantity of sewage after which it is automatically pumped out of the tank to a higher level from which it flows by gravity to the next lift station or to a treatment plant or other disposal system. A sewer gas deactivation and deodorizing unit comprising a suitable heating and burning unit utilizing, as the primary source of heat, a gas burner which may either simply heat the sewer gas as it is drawn from the tank by a blower and blown through the heating unit or which may premix the sewer gas and the air and gas supplied to the burner so that the mixed gas burns directly. Air is supplied to the tank from the atmosphere through a relatively small inlet pipe at a point adjacent to the inner wall of the tank through an inlet opening or nozzle extending substantially peripherally horizontally preferably about one-fourth to one-third of the depth of the tank down from the top so as to direct air peripherally over the inner wall surface of the tank in order to produce a circulatory scavenging flow of mixed air and gas in the tank over the exposed part of this surface. The mixed air and gas is withdrawn from the tank through an exhaust pipe which is relatively much larger than the air inlet and which has intake preferably at about one half the depth of the tank and centrally thereof a predetermined distance above the maximum height of sewage in the tank. This assures a good mixture of the air and sewer gas before it is withdrawn and places the gas exhaust intake at or near the center of a vortex circulation of the mixed gas. Provision is made for stopping the exhaust blower under abnormal operating conditions, such as an excessive rise in the level of the collected sewage or nonfunction of the gas deactivator.

20 Claims, 10 Drawing Figures

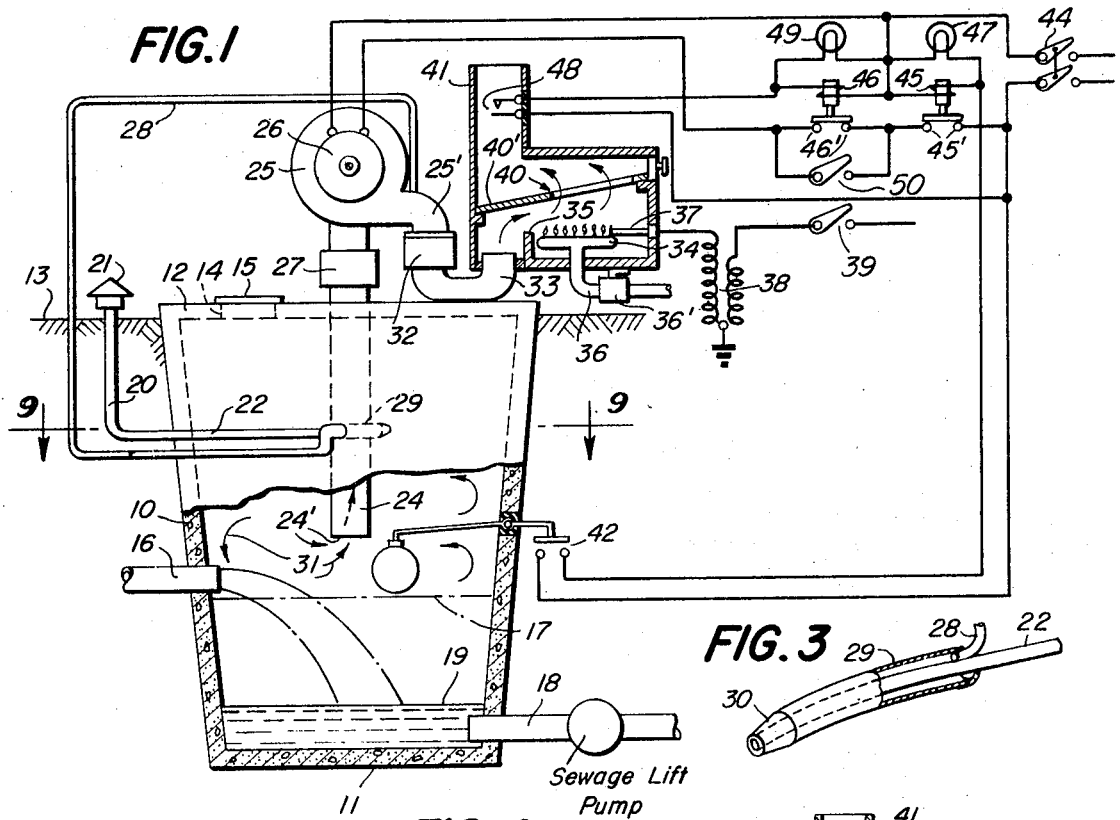
FIG. 1
FIG. 3
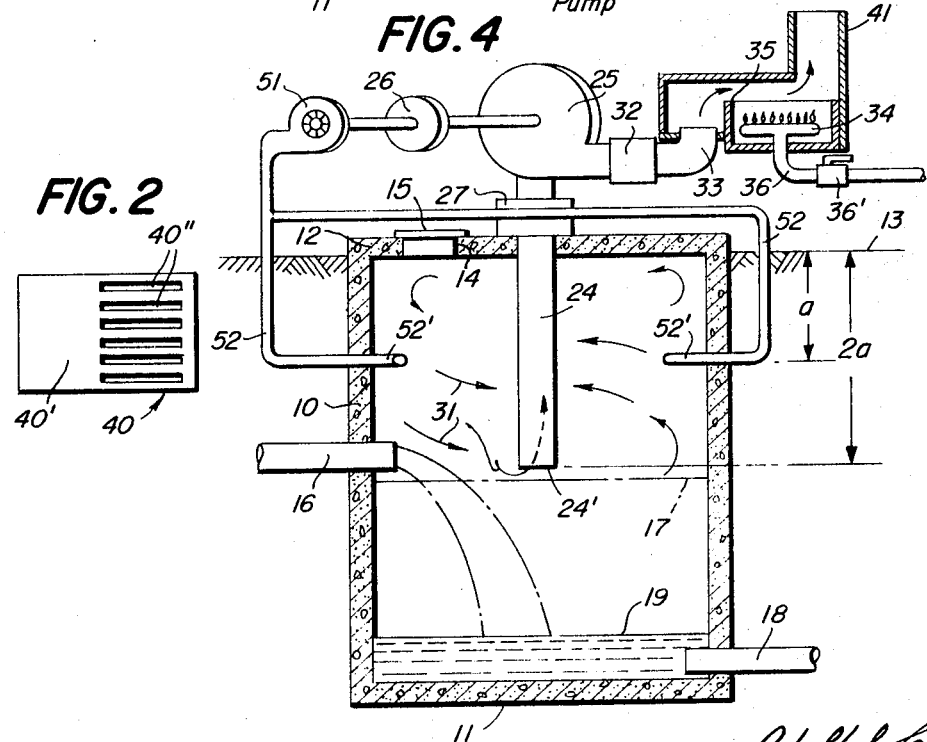
FIG. 2
FIG. 4
Sewage Lift Pump
INVENTOR
Adolph C. Hugin PATENTED APR 11 1972 3,655,053
SHEET 2 OF 2
FIG. 5
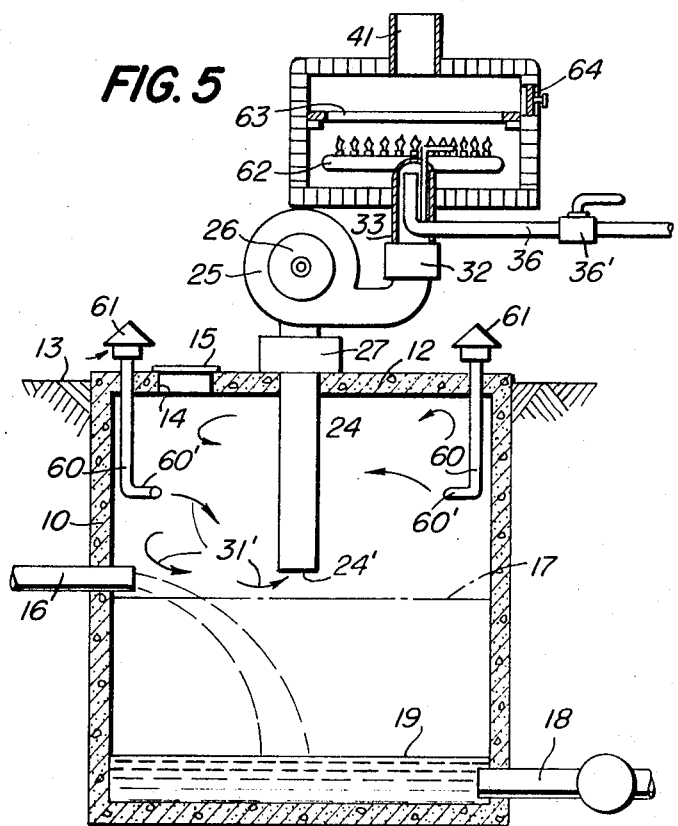
FIG. 6
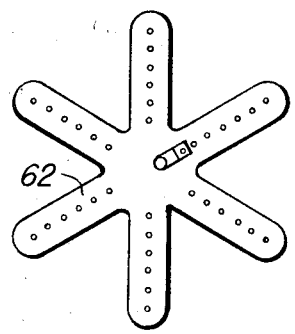
FIG. 7
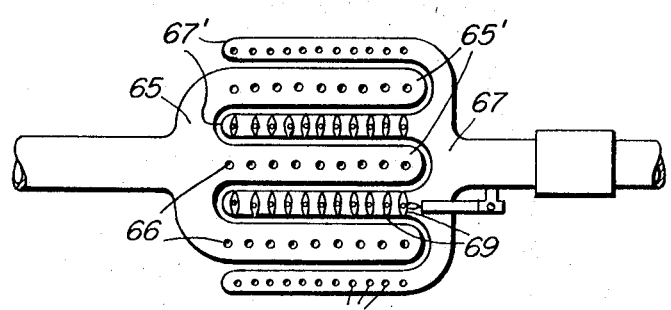
FIG. 8
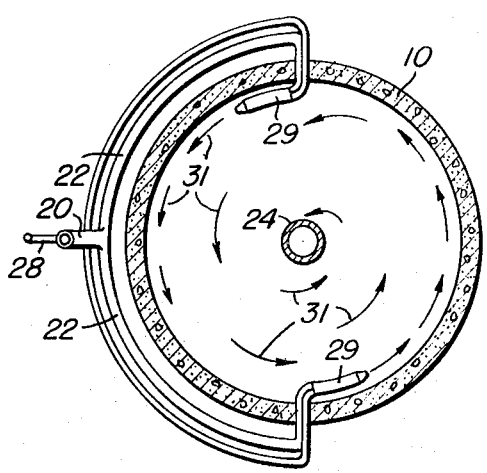
FIG. 9
FIG. 10
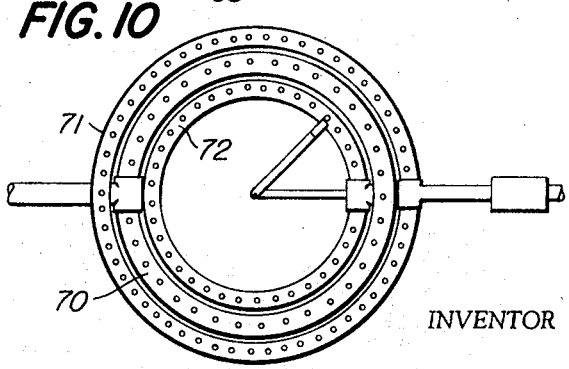
INVENTOR
Adolph C. Hugin 3,655,053

SEWAGE LIFT STATION

FIELD OF INVENTION

This invention pertains to sewage lift stations and particularly to an improved apparatus for deactivating and deodorizing noxious gases vented therefrom and for minimizing the destructive effects of sewer gas on the lift tanks or wells by a scavenging and drying of the tank surfaces by circulation of fresh air as it is mixed with the sewer gas in the tank and subsequent oxidation and decomposition of the gas by heating and burning thereof.

BACKGROUND OF INVENTION

Conventional sewers are installed with a gradient or slope in order to obtain a gravity flow of the sewage through the pipes to a point of disposal. In general, the sewer pipes reach a depth below ground surface where it is impractical and uneconomical to continue the pipes to a greater depth. This is especially the situation where the contour of the land rises after a general downward slope or a long level section and the sewer line must be taken up and over or through the rise. This also arises in level areas after a certain length of sewer down grade becomes too deep for further down grade. It is customary to install a lift station at such a point.

Lift stations of this type comprise a collection well or tank, usually in the form of a concrete walled pit into which sewage flows by gravity. Generally, when the well becomes about half full, a pump automatically is turned on and pumps the sewage out from near the bottom of the well to a higher level into a sewer pipe at this higher level, where it again drains by gravity to the point of disposal or, if need be, to another lift station, until it eventually reaches a point of disposal. The pump is automatically stopped when the sewage in the well has been lowered to a predetermined level.

Such wells generally extend to ground level and all have at least a reasonably large chimney to ground level with a manhole at the top. The maximum sewage level in the well for turning on the pump should be slightly lower than the sewer inlet pipe into the tank in order to prevent backing up of sewage in the sewer line above the lift station. This results in a considerable reservoir space above the sewage in the well in which sewer gas collects. As the level of sewage rises in the well, the sewer gas which has collected in the well generally is vented to the atmosphere through vents provided for this purpose or through leaks in or around the cover or top of the well. This releases these offensively odorous and noxious gases into the air where they are free to drift into residential areas and even into homes, creating a foul stench and even carrying poisonous elements to such places. The general content of this gas is a mixture of carbon dioxide, methane, and hydrogen sulfide.

Not only is the discharge of this sewer gas a highly undesirable pollutant of the ambient air, but it also tends to combine, especially the hydrogen sulfide content, with moisture which condenses and collects on the exposed wall surfaces of the well, forming acids which disintegrate the walls. This, in time, requires expensive repairs, and, and, on occasions, has even resulted in deaths of maintenance men who inhaled the sewer gas while making repairs.

In order to deodorize and render less noxious the gases discharged from sewer lift stations, it has long been proposed to heat the gas to high temperatures, as by passing them through a furnace or the like. Examples are shown in U.S. Pat. Nos. 241,819—Ogilvie (188), 248,216—Reese (188), 355,295—Benson et al., and many others. None of these, however, solved the problem of preventing the deterioration of the well walls and providing an efficient deactivation of the sewer gas.

SUMMARY OF THE INVENTION

The present sewer lift station invention comprises a sewage collecting well or tank with a sewage inlet and a sewage outlet near the bottom of the tank and means for automatically pumping out the sewage when it reaches a predetermined level in the tank and stopping the pumping when it reaches a predetermined minimum level. Fresh air is supplied into the tank above the sewage inlet and is directed peripherally over the inner walls of the tank so as to scavenge and dry these walls. The air becomes mixed with sewer gas and is exhausted from the tank through an exhaust having an intake substantially centrally of the tank above the level of the sewer inlet and at about the center of a vortex flow formed by the circulating mixed air and gas. A blower draws the mixed gas out through the exhaust and blows it into a deactivating heating unit where it preferably is burned by a gas burner and passed over heating surfaces, such as through an incandescent grate, so that it is deodorized and otherwise deactivated and rendered non-noxious. These results are further improved by various structural and operating details.

An object of this invention is to provide an improved sewer lift station having a sewer gas deactivator combined therewith.

Another object of this invention is to provide an improved sewage lift station having an improved air-sewage gas mixing system for minimizing tank wall deterioration.

Further objects and advantages of this invention will be apparent from the following description referring to the accompanying drawings, and features of novelty which characterize this invention will be pointed out with particularity in the claims appended to and forming a part of this specification.

BRIEF DESCRIPTION OF FIGURES OF DRAWINGS

In the drawings:

FIG. 1 is an elevational view, partly broken away and partly schematic, illustrating an embodiment of the present invention;

FIG. 2 is a plan view of the grate of the deactivator of FIG. 1;

FIG. 3 is a perspective view of the nozzle end of the air inlet of FIG. 1, showing the eduction tube structure thereof;

FIG. 4 is an elevational view, partly in section, of another embodiment of the present invention;

FIG. 5 is an elevation, partly in section, illustrating yet another embodiment of the present invention;

FIG. 6 is a top plan view of the burner shown in FIG. 5;

FIG. 7 is a top plan view of another type burner usable in deactivators of the FIGS. 1, 4, and 5 types;

FIG. 8 is an elevational view of a flame spreader as used in the deactivator shown in FIG. 5;

FIG. 9 is a sectional view taken along line 9—9 of FIG. 1 illustrating details of the air inlet and exhaust; and FIG. 10 is a top plan view of a further type burner usable in deactivators of the FIGS. 1, 4, and 5 types.

DETAILED DESCRIPTION OF INVENTION

Referring to the drawings, FIGS. 1, 2, 3, and 9 illustrate an improved sewage lift station according to this invention comprising a storage tank 10, preferably made of concrete and having a circular section or curved sides in order to facilitate spiral or vortex circulation of air and gas therein. In addition, a slight taper or outward flare from bottom to top of the tank is provided, although not essential, to further aid in producing the vortex gas flow. If a rectangular tank is used, the corners should be formed with a fairly sized radius of curvature to avoid sharp turns and induce a smoother circulation of the air and gas. The bottom 11 and top 12 are made substantially horizontal, with the top 12 level with the adjacent ground 13 or slightly higher. A manhole 14 is provided in the top 12 to provide for ready servicing of the tank, and it is kept closed during normal usage by a suitable removable cover 15, which preferably has a fairly good fit so as to minimize leakage of air around the cover. This is desirable for two reasons mainly: first, to prevent leakage of noxious sewer gas out of the tank around the cover, and second, to prevent leakage of air into the tank around the cover. In the past it has been found that air leaking around a cover into such a tank forms acids with the sewer gas and moisture in the tank which attacks the tank and results in relatively rapid deterioration of the tank around the cover.

A sewage inlet pipe 16 extends through the side wall of the tank, preferably one-half to two-thirds down from the top of the tank, at a point above the normal maximum sewage level in the tank, indicated by a dot-dash line 17. As in conventional sewage lift stations, when the sewage in the tank reaches the level 17, a discharge pump is started automatically by a suitable control, all not illustrated, and the sewage is pumped out of the tank through an outlet pipe 18 which extends through the tank near the bottom thereof. The sewage removal from the tank is sufficiently fast to assure lowering the level in the tank, and when the level falls to a point, as indicated by line 19, slightly above the top of the intake of outlet pipe 19, the pump is automatically stopped by a suitable control responsive to this minimum level. This prevents pumping sewer gas out through the outlet transfer pipe 18.

As sewage collects in the tank 10, sewer gas is released and collects in the tank above the sewage, so that as the sewage level rises in the tank, this sewer gas tends to be compressed, and its resultant higher pressure tends to cause it to leak out of the tank into the ambient air above, if some provision is not made to remove it otherwise from the tank. This gas is both odorous and noxious, so that it is desirable that it be treated to deactivate and deodorize it before it is released to the atmosphere.

In order thus to deactivate and deodorize the sewer gas, a deactivator system is provided for the lift station which includes a source of fresh air supply formed, in this embodiment, by an inlet pipe 20, having a suitable cover 21 to prevent entry of foreign substances into the pipe 20, while allowing free passage of air thereinto. This pipe preferably is connected to a pair of distributing pipes 22, extending in opposite directions around the periphery of the tank 10, FIG. 9, to substantially diametrically opposite points where they enter the sides of the tank 10 at from one-fourth to one-half the depth of the tank down from the top thereof, preferably from one-fourth to one-third of the depth from the top. The reason for this will be explained later.

In order to assure against the exhaust of sewer gas through the air inlet 20, a gas exhaust pipe 24 extends substantially axially centrally through the top of the tank to a distance between one-third to two-thirds of the tank depth from the top thereof, depending on the position of the air inlet 22 and the maximum sewer level 17 of the tank, the intake 24' of the exhaust being spaced below the air inlet and above the sewer inlet 12, and, therefore, above the level 17. This exhaust 24 also is of a substantially larger size than the air inlet 22 so as to assure a lower pressure in the tank 10 than atmospheric pressure in the air inlet pipe 22 to minimize possible back flow of gas through the air inlet and leakage around the manhole cover 15. This suction on the exhaust is provided by a suitable blower 25 driven by a prime mover, such as an electric motor 26. The blower 25 intake is connected to the exhaust pipe 24 through a suitable filter 27 to minimize the passage of liquid or other foreign material from the tank into the blower.

In this embodiment, a bleeder pipe 28 is connected to the exhaust side of the blower 25 and extends to both air inlet pipes 22 and into the tank 10 adjacent to the point of entry thereinto of pipes 22. The end of each pipe 28 connects to an eduction tube 29 in the form of a nozzle which surrounds the end of each air inlet pipe 22 and has a tapered funnel-shaped mouth 30 which terminates substantially at the end of the tube 22 therein. The pressure of the gas blown through the bleeder tube 28 into the eduction nozzle 29 and out of its mouth 30 induces a suction in the inner end of the pipe 22 and blows the air thus drawn into the tank in the direction of the nozzle exhaust. As shown in FIG. 9, the nozzle preferably is curved in the direction of the adjacent inner surface of the wall in a substantially horizontal direction, the nozzles on opposite sides of the tank extending in the same direction so as to produce a circulatory flow of air in the tank over the inner exposed walls.

Generally, the sewer gas is moist, and the walls of the tank are cool due the surrounding earth. This tends to cause condensation of moisture from the sewer gas on the inner exposed surfaces of the tank walls which tends to form acids with the sewer gas which will produce deterioration and disintegration of the tank walls. The circulation of the air over these exposed inner wall surfaces scavenges and dries them, entraining the moisture in the mixed air and gas drawn out of the tank 10 by the blower 25. In addition to circulating the air over the wall surfaces by the inlet nozzle 29, the location of the air inlet about half way down from the top of the tank to the depth of the exhaust intake 24' aids in creating a circulation which produces a vortex swirl of the air as indicated by arrows 31, which thoroughly mixes with the sewer gas in all the space above the sewage in the tank and draws it through the exhaust intake located substantially in the center of the eye of the vortex. These are especially important aspects of the present invention, for, although it is old to seek to remove sewer gas from lift stations and to try to deactivate and deodorize it, there has remained the expensive and dangerous repair needs due to the deterioration by the acids formed on the tank walls.

Deactivation of the sewer gas is efficiently accomplished by exhausting the mixed air and sewer gas from the blower 25 into a suitable burner. This mixture of gases is generally quite flamable and a flame arrester 32 of suitable type is mounted between the blower outlet 25' and a conduit 33 which conducts the mixed gases into the burner unit. In the FIG. 1 unit, a suitable burner 34 is mounted in the base and separated by a baffle 35 from the conduit 33 outlet so that the mixed gases are prevented from blowing directly at the burner 34. The burner 34 may be supplied by any suitable gas, such as natural or bottled gas, through a gas supply 36 and a flame regulating valve 36'. The gas flame may be ignited by any suitable means, such as an electrical electrode 37 energized by a suitable transformer 38 connected to a source of electrical supply by a switch 39. As will be explained later, the burner and the mixed gas inlet to the burner unit may take a variety of forms. The important feature in all the burners is that they must effectively oxidize and deactivate the sewer gas into non-noxious gases and deodorize it in so doing.

In the FIG. 1 burner unit, a grate 40, preferably of a clay brick material, is formed as shown in plan view in FIG. 2, with an imperforate baffle wall portion 40' which extends over the blower conduit 33 outlet so as to redirect and distribute the mixed gases over the flame of the burner 34. The grate 40 preferably is supported in the burner unit at a slight angle so as to direct the gas upwardly toward the side of the burner opposite to the conduit 33 outlet. The section of the grate 40 over the burner 34 is formed with a suitable plurality of passages therethrough which may take any form, such as slots 40'', through which the burned, heated gases flow. Preferably the flame of the burner 34 is regulated so that the grate above the flame is heated to incandescence, whereby the gases passing through the grate are heated to between 900° F. and 1,800° F., an average of about 1,200° F., depending upon the general sewage content which affects the composition of the sewer gas. The flame regulator 36' can be adjusted to provide the desired deactivation and deodorization provided at each lift station of the burned gases exhausted from the burner unit stack 41.

Certain safety precaution features of this invention are desirable, although one or more of them may be omitted in some installations. As has been explained, the lift station is provided with a conventional sewage pump and control system (not shown), which automatically starts pumping sewage out of the tank 10 when the sewage level reaches a predetermined maximum level, as indicated at 17, and stops pumping when it falls below another level, as indicated at 19. Should the pumping for any reason not begin when the sewage reaches level 17, it is desirable that the blower 25 be stopped, so as to prevent drawing sewage up into the blower and the gas deactivation system, including the filter 27, the flame arrester 32, and the burner unit. This is provided by a high-level controlled emergency switch 42, operable in any suitable manner, as by a float 43. This switch is connected to a source of electrical supply by a main switch 44 and in series with a relay 45. The main switch 44 normally connects the blower motor 26 to the source of electrical supply through relay contacts 45' and 46' of relays 45 and 46, respectively, when these relays are both deenergized. Closure of energizing switch 42 energizes the coil of relay 45, thereby opening contacts 45', which opens the energizing circuit of blower motor 26. This shuts down the blower 25 and prevents drawing of sewage up through the gas exhaust 24 into the gas deactivation system. Preferably, a signal is given to indicate the occurrence of this emergency. Such a signal may comprise an audible or a visual signal, such as a light 47 connected across the coil of relay 45 which will be lit whenever the coil is energized. Such a signal device 47 can be located at the site of the lift station or may be located at a remote control station and will indicate that the particular lift station has shut down or is not pumping adequately to maintain its proper operation.

During normal operation of the lift station, the gas deactivation system is operated continuously. If, for any reason, the burner should stop heating and burning the gas, it is desirable that the blower 25 be stopped, so as to minimize blowing raw sewer gas into the ambient atmosphere. This control of the blower is provided by a thermostat 48 which is operable in response to the temperature of gas in the stack 41. When the burner is in operation, the stack gas will be warm and the thermostat 48 will be open-circuited responsive to this gas temperature. When the burner is not in operation, the stack gas temperature falls and the thermostat 48 is made operable to a predetermined minimum stack gas temperature to close a circuit therethrough. The thermostat is connected across the main switch 44 in series with the coil of relay 46, so that as long as the stack gas is above a predetermined temperature indicative of proper operation of the burner, the thermostat 48 is open-circuited and the coil of relay 46 is deenergized. As explained, cooling of the stack gas results in closure of the thermostat, thereby energizing the coil of relay 46. This opens relay contacts 46' and stops blower motor 26. A signal similar to that for operation of relay 45 is provided and includes a signal light 49 connected across the coil of relay 46, so that it is lit whenever relay 46 is energized and indicates that the burner is not operating properly. When first starting the lift station, it generally is desirable to start operation of the blower 25. In order to allow energization of the blower motor 26 under this condition, when the stack gas may not be sufficiently hot to cause opening of the thermostat 48', a relay shunting switch 50, connected across relay contacts 46', may be closed. This renders relay 46 incapable of affecting the operation of blower motor 26, so that the condition of thermostat 48 has no effect on motor 26. After a period when the stack gas has been raised in temperature, the switch 50 should be opened so as to place the thermostat 48 and relay 46 into the motor 26 control circuit. The switch 50 may be omitted if desired, since the burner will heat the stack gas after a while, with a resultant opening of the thermostat 48 and consequent closing of relay contacts 46', whereby the motor 26 will be energized and the blower 25 operated.

In order to simplify the drawings and explanations, the emergency controls and burner ignition circuitry, which are usable with all of the embodiments of this invention, are not shown or described with reference to the other illustrated embodiments. Also the same reference numerals are applied to the same parts for all illustrated embodiments.

Another embodiment of the present invention is shown in FIG. 4, wherein the tank 10 is formed with substantially vertical sides to provide a greater relative proportion of the total tank volume for collection of sewage than in a sloping sided tank, as shown in FIG. 1. The tank 10 also has a bottom 11 and a top 12 which is at or near the adjacent surface 13 of the earth. Access to the interior of the tank for inspection and repairs is provided by a manhole 14, suitably closed by a tight-fitting cover 15. An inlet pipe 16 delivers sewage at or near half the depth of the tank, slightly above the maximum level 17 to which sewage collects before a pump (not shown) begins pumping out the sewage, as in the FIG. 1 embodiment. The sewage thus pumped is drawn out through an outlet pipe 18 near the bottom of the tank, having its intake slightly lower than the minimum level 19 of sewage in the tank, at which level the exhaust pump is stopped.

In this embodiment, fresh air is blown into the tank 10 by a relatively small blower 51 which is driven by the main blower motor 26, so that it is operated concurrently with the operation of the relatively larger exhaust blower 25. Air from the inlet blower 51 is conducted through conduits 52 to opposite sides of the tank and enters the tank through inlet sections 52', which are curved adjacent to the inner walls of the tank so as to direct the air circulation over these inner walls to provide a moisture scavenging and drying contact therewith and to create a vortex circulation of the mixed air and sewer gas in the tank. This mixed gas is withdrawn through the exhaust pipe 24, which has its intake 24' substantially centrally of the tank and at the center of the eye of the mixed gas vortex. Preferably, the air inlet sections 52' open into the tank at between one-fifth to one-half the depth of the tank down from the top 12, and the exhaust intake is spaced above the sewage inlet 16 at a depth between one-third and two-thirds of the depth of the tank down from the top 12. The best spacing for efficient mixing of the gas and air and for scavenging and drying of the exposed inner tank walls is one wherein the depth 2a of the exhaust intake 24' is about twice the depth a of the air inlet 52'. In all cases, the exhaust intake 24' must be a safe distance above the maximum level 17 to which the sewage normally is allowed to accumulate before being pumped out, so as to assure against withdrawal of sewage through the gas exhaust system.

Deactivation and deodorization of the withdrawn gases is provided by drawing the mixed gases out through exhaust pipe 24 and filter 27 by the blower 25 and blowing it through a flame arrester 32 and burner inlet conduit 33 over a baffle 35 so that it passes over a burner 34 flame. In this simplified burner, no grate is shown, but the gases pass substantially the full length of the burner unit before being exhausted to atmosphere through the stack 41. As in the FIG. 1 embodiment, the burner gas flame can be regulated by a suitable valve 36' to raise the temperature of the gases to between 900° F. and 1,800° F., for the reasons previously described with reference to FIG. 1. The exhaust blower 25 and exhaust pipe 24 both are larger than the inlet blower 51 and the air inlet pipes 52, respectively, in order to assure against having a gas pressure in the tank 10 above atmospheric pressure so as to minimize the possibility of leakage of untreated sewer gas from the tank.

A further embodiment of the present invention is shown in FIG. 5, wherein the tank 10 is formed with substantially vertical sides as in the FIG. 4 structure. The tank has a bottom 11 and also a top 12 at or slightly above the adjacent surface 13 of the earth. A manhole 14 provides access to the interior of the tank for inspection and repairs, and is closed by a tight-fitting cover 15. Sewage is delivered to the tank 10 through an inlet pipe 16 at or near half the depth of the tank, slightly above the maximum level 17 to which sewage collects before a pump (not shown) starts pumping out the sewage, as explained with reference to the FIG. 1 embodiment. Sewage thus pumped is drawn out through an outlet pipe 18 near the bottom of the tank and having its intake slightly lower than the minimum level 19 of sewage in the tank, at which level the sewage exhaust pump is stopped.

In this embodiment, fresh air is drawn into the tank 10 through suitable inlet pipes 60 having intake openings above the top 12 of the tank and preferably covered with a cover 61 for preventing entry of foreign matter into the pipes 60 while allowing free passage of air thereinto. The inlet pipes 60 are formed with air directing ends 60', which preferably are curved to the inner contour of the walls of tank 10 and extend substantially horizontally in the same direction on opposite sides of the tank. One or more than two, in some cases, of these air inlets may be used, depending upon the size and shape of the tank. As in the other embodiments, the air directing ends 60' of the air inlets are placed between one-fifth to one-half the depth of the tank down from the top 12.

Mixed sewer gas is drawn from the tank through an exhaust conduit 24 by an exhaust blower 25 driven by a suitable motor 26. The exhaust conduit 24 is substantially larger than the combined size of the air inlet pipes 60, so that a definite suction is placed on the inlet pipes. This causes the air to pass from the inlets 60' at a velocity sufficient to set up a scavenging circulation of the air over the inner exposed surfaces of the tank and thoroughly mixes the gas in a vortex swirl as indicated by arrows 31'. The exhaust conduit 24 is placed substantially axially centrally of the tank with its intake 24' above the sewer inlet pipe 16, so as to assure against entry therein of sewage and to locate it at substantially the center of the eye of the vortex of mixed air and sewer gas. A filter 27 is placed between the exhaust conduit 24 and blower 25, so as to limit the exhaust through the blower to mixed nongaseous substances.

Deactivation and deodorization of the sewer gas again is provided by heating and burning of the gases at a temperature between 900° F. and 1,800° F. for reasons previously explained. The exhaust blower 25 outlet passes into a burner unit through a flame arrester 32 to prevent a possible back fire. In this structure, the gas burner is fed from a gas supply, such as natural gas, through a gas regulating valve 36' into a gas conduit 36 which opens into a common burner 62 to which the mixed air and sewer gas is fed by a conduit 33. A plan view of the burner 62 is showm in FIG. 6. The gas is regulated by valve 36' in order to assure a proper burning mixture in the burner 62 and to produce the desired deactivating temperature of the burned gas. A conventional grid grate 63, preferably of clay brick material, is mounted above the burner 62 and is heated to incandescence so as further to assure thorough heating and deactivation of the gases as they pass through the grate on their way to the atmosphere through the burner stack 41. A suitable door 64 is provided for inspection and repair of the burner and related structure.

The various gas deactivating burners and other lift station parts are interchangeable and other types of burner units can also be used. FIGS. 7 and 10 illustrate variations in specific burner details suitable for the desired sewer gas deactivation.

In FIG. 7 the mixed sewer gas is fed to a digitated gas diffusing member 65 having a series of perforations 66 in the top of each digital element 65'. Gas from a gas supply is fed to a digital burner 67 arranged with digital elements 67' interdigitated with and on both outer sides of elements 65', with gas outlet perforations 68 on the top sides thereof. Thus, when the gas from burner 67 is ignited, it produces a heating flame on both sides of the mixed sewer gas digital elements 65' and assures the efficient heating thereof. The effectiveness of this type burner can be further enhanced by the use of flame spreaders on the perforations of the inner gas digital elements 67'. FIG. 8 illustrates a suitable flame spreader 69 threadedly mounted in an aperture 68 of a digital element 67'. As shown, the flame spreader is mounted so as to spread the gas flame 70 transversely of the digital element 67' to make it extend toward the adjacent sewer gas digital elements 65', thereby further assuring thorough heating of the sewer gas emitted from the digital apertures 66. Generally, only the inner gas digital elements 67' need be provided with flame spreaders.

FIG. 10 illustrates another efficient burner structure in which the mixed sewer gas and air is exhausted through a ring member 70, perforated on the top to direct the gas upwardly therefrom. The gas burner comprises a pair of concentric rings 71 and 72 arranged on opposite sides of the sewer gas exhaust ring 70 and formed with perforations in the top thereof for the passage of heating gas. Thus, when the gas burner is lit, the sewer gas exhaust ring is surrounded on both sides with gas flames which effectively heat and burn the sewer gas to deactivate and deodorize it. at the desired temperatures.

While particular embodiments of this invention have been described and illustrated, modifications thereof will occur to those skilled in the art. It is to be understood, therefore, that this invention is not to be limited to the exact details disclosed.

The invention claimed is:

1. A sewage lift station comprising:
   a tank having a sewage inlet with space for gas above the sewage inlet;
   an outlet for sewage in the lower part of said tank;
   means forming an air inlet to said tank having an opening into said tank spaced from one-fifth to one-half the depth of said tank from the top thereof and above said sewage inlet, said air inlet means being formed and arranged to direct air peripherally adjacent to the inner wall of said tank in a direction for producing a circulatory scavenging flow of mixed air and gas in said tank and over the inner exposed surfaces thereof;
   means forming an exhaust for mixed air and gas and having an intake below said air inlet opening and spaced above said sewage inlet at a depth in said tank of from one-third to two-thirds of the tank depth from the top thereof;
   means having a heating means for deactivating and deodorizing gas exhausted from said tank; and
   a blower connecting said exhaust means to said deactivating and deodorizing means for withdrawing the mixed air and gas from said tank and passing it into said deactivating and deodorizing means for heating it to oxidize and decompose it.

2. A sewage lift station as defined in claim 1 having means responsive to sewage at a predetermined level in said tank and below said gas exhaust means intake for pumping sewage out of said tank through said sewage outlet.

3. A sewage lift station as defined in claim 1 wherein said air inlet means opening is substantially one third of the tank depth down from the top of the tank.

4. A sewage lift station as defined in claim 1 wherein said gas exhaust means intake is substantially two-thirds of the tank depth down from the top of the tank.

5. A sewage lift station as defined in claim 4 wherein said exhaust gas intake is substantially along the central vertical axis of said tank.

6. A sewage lift station as defined in claim 4 wherein said tank is substantially circular in horizontal section and said air inlet means comprises a tubular air-directing section extending at the stated depth substantially circumferentially adjacent to the inner surface of the tank and having said opening adjacent to said inner surface for providing said circulatory air flow, and said gas exhaust intake is substantially along the central vertical axis of said tank.

7. A sewage lift station as defined in claim 1 wherein said tank is substantially circular in horizontal section and said air inlet means comprises a tubular air-directing section extending at the stated depth substantially circumferentially adjacent to the inner surface of the tank and has said opening adjacent to said inner surface for producing said circulatory air flow.

8. A sewage lift station as defined in claim 7 wherein said gas exhaust intake is substantially along the central vertical axis of said tank.

9. A sewage lift station as defined in claim 1 wherein said gas exhaust intake is substantially along the central vertical axis of said tank, said air inlet means comprises a tubular air-directing section extending at the stated depth substantially peripherally adjacent to the inner surface of the tank and having an opening adjacent to said inner surface for providing said circulatory air flow, said air directing section having a nozzle forming said opening and comprising an eduction tube and an air inlet tube, and a bleeder connection from the exhaust side of said blower to said eduction tube for educting air through said inlet means into said tank to produce a vortex circulatory air flow therefrom to said exhaust intake.

10. A sewage lift station as defined in claim 1 wherein said heating means comprises a burner connected to said blower and having a fuel supply to said burner whereby said fuel is mixed with the exhaust drawn from said tank by said blower and burned by the burner flame.

11. A sewage lift station as defined in claim 1 wherein said heating means comprises a fuel burner, means for supplying fuel thereto, a baffle for directing exhaust from said blower over said burner, and an outlet for discharging the burned gases from said burner.

12. A sewage lift station as defined in claim 1 wherein said heating means comprises a plurality of fuel burning elements, and at least one sewer gas diffusing element between said fuel burning elements.

13. A sewage lift station as defined in claim 12 wherein said fuel burning elements comprise concentric ring-type burner elements, and said sewer gas diffusing element comprises a substantially concentric ring-type element with perforations forming outlets for the sewer gas.

14. A sewage lift station as defined in claim 12 wherein said fuel burning element comprises digital burner elements, and said sewer gas diffusing element comprises a digital element interdigitated with said fuel burning elements.

15. A sewage lift station as defined in claim 1 wherein said heating means comprises a plurality of digital fuel burning elements, a plurality of digital sewer gas diffusing elements interdigitated with said fuel burning elements with the latter on both outer lateral sides of each sewer gas element, and a means on each inner digital fuel burning element comprising a fuel flame spreader for spreading the flame transversely of said element toward the adjacent gas diffusing elements.

16. A sewage lift station as defined in claim 1 having means operable in response to sewage level in said tank above a predetermined level for stopping said blower.

17. A sewage lift station as defined in claim 16 having means for indicating operation of said means for stopping said blower.

18. A sewage lift station as defined in claim 1 having means operable in response to non-heating of said heating means for stopping said blower.

19. A sewage lift station as defined in claim 18 having means for rendering inoperative said non-heating response blower stopping means.

20. A sewage lift station as defined in claim 18 having means for indicating operation of said means for stopping said blower.

* * * * *